his Patent Office
2,859,256
Patented Nov. 4, 1958

2,859,256

SEPARATION PROCESS INVOLVING ADSORPTION AND DESORPTION

Howard V. Hess, Glenham, and Michael D. Riordan, Fishkill, N. Y., assignors to The Texas Company, New York, N. Y., a corporation of Delaware No Drawing. Application January 28, 1955
Serial No. 484,833

5 Claims. (Cl. 260—676)

This invention relates to a method of separating a mixture of organic compounds. More particularly this invention relates to a process for the separation of straight chain organic compounds, such as straight chain hydrocarbons, from a mixture containing the same together with non-straight chain organic compounds, such as non-straight chain hydrocarbons, involving adsorption of the straight chain organic compounds followed by desorption of the adsorbed straight chain organic compounds. In accordance with one embodiment the practice of this invention is particularly applicable to the separation of straight chain hydrocarbons from a mixture containing the same such as a petroleum fraction, a synthetic petroleum fraction, e. g. Fischer-Tropsch hydrocarbon synthesis fraction, a shale oil fraction and the like.

A number of processes have recently been proposed for treating or upgrading a hydrocarbon-containing fraction, such as a petroleum fraction containing straight chain and non-straight chain hydrocarbons, by selectively adsorbing the straight chain hydrocarbons therefrom by means of an adsorbent which selectively adsorbs straight chain hydrocarbons to the substantial exclusion of the non-straight chain hydrocarbons. For example, in co-pending, co-assigned patent application Serial No. 478,-426, filed December 29, 1954, there is disclosed a method for upgrading a petroleum fraction by selectively adsorbing the straight chain hydrocarbons therefrom. Similarly in patent application Serial No. 483,998, filed January 25, 1955, there is disclosed a method for upgrading a catalytic reformer effluent, such as a Platformate, by selectively adsorbing the straight chain hydrocarbons therefrom. In each of the above-identified patent applications H. V. Hess, one of the co-inventors of the subject application, is a co-inventor.

Previously disclosed methods for treating a mixture of straight chain hydrocarbons and non-straight chain hydrocarbons, involving selective adsorption of the straight chain hydrocarbons, have involved isobaric adsorption-desorption operations, that is, adsorption-desorption operations carried out at substantially the same absolute pressure. When operations involving adsorption and desorption of straight chain hydrocarbons are carried out at substantially the same pressure it has been a practice to carry out the desorption operation at an elevated temperature, higher than the adsorption temperature, so that the adsorbed straight chain hydrocarbons may be more quickly desorbed from the adsorbent. Accordingly a desorption temperature substantially greater, for example 100–400° F. higher than the adsorption temperature, has been employed. Following the high temperature desorption operation, indicated above, the resulting desorbed-regenerated adsorbent must be cooled to the desired operating adsorption temperature. This cooling of the hot desorbed-regenerated adsorbent is time consuming and expensive. Moreover, it is obvious that the time required to effect cooling of the hot desorbed-regenerated adsorbent down to the desired adsorption temperature restricts the throughput or capacity of the adsorptive separation process.

It is an object of this invention to increase the rate at which adsorbed straight chain organic compounds can be desorbed from a selective adsorbent containing the same.

It is another object of this invention to provide an improved process involving the selective adsorption of straight chain hydrocarbons from a mixture containing the same together with non-straight chain hydrocarbons, followed by desorption of the adsorbed straight chain hydrocarbons.

It is another object of this invention to provide a process for the adsorptive separation of straight chain hydrocarbons from a mixture containing the same together with non-straight chain hydrocarbons whereby an increased rate of desorption of the adsorbed straight chain hydrocarbons from the adsorbent material is possible.

Still another object of this invention is to provide a process for the selective adsorption of straight chain hydrocarbons from a mixture containing the same, involving isothermal adsorption and desorption operations.

Still another object of this invention is to provide a convenient method for effecting the desorption of straight chain hydrocarbons from an adsorbent material containing straight chain hydrocarbons adsorbed therein.

How these and other objects of this invention are accomplished will become apparent in the light of the accompanying disclosure. In at least one embodiment of this invention at least one of the foregoing objects will be achieved.

In accordance with our invention an improved adsorption-desorption operation is effected, involving the separation of straight chain organic compounds, such as straight chain hydrocarbons, from a mixture containing the same by contact with a selective adsorbent which selectively adsorbs straight chain hydrocarbons to the substantial exclusion of non-straight chain hydrocarbons, by contacting said mixture with the above-described selective adsorbent at a relatively elevated pressure $P_1$ to adsorb straight chain organic compounds, such as straight chain hydrocarbons, and desorbing the adsorbed straight chain organic compounds from the adsorbent material by subjecting the adsorbent material containing adsorbed straight chain organic compounds to a relatively reduced pressure $P_2$, $P_1$ being greater than $P_2$.

Any selective adsorbent material which selectively adsorbs straight chain organic compounds, such as the straight chain hydrocarbons, to the substantial exclusion of non-straight chain organic compounds, such as the non-straight chain hydrocarbons, is suitable in the practice of this invention. By straight chain organic compounds is meant any acyclic, straight chain organic compound which does not evidence side chain branching. Examples of straight chain organic compounds are the normal paraffins, e. g. n-butane, n-pentane and their higher molecular weight homologues, the n-butenes, the n-pentenes and their higher molecular weight homologues, the normal polyolefins, such as the butadienes and the normal acetylenic hydrocarbons, e. g. n-butyne. By non-straight chain organic compounds is meant any aromatic, alicyclic or naphthenic, or acyclic or aliphatic compound which possess side chain branching. Examples of non-straight chain organic compounds are benzene, toluene, isopentane, isohexane, cyclohexane, methylcyclohexane, cyclopentadiene, and their respective higher and lower molecular weight homologues.

In the practice of this invention it is preferred to employ as the selective adsorbent material certain natural or synthetic zeolites or alumino-silicates, such as a calcium alumino-silicate, which exhibit the properties of a molecular sieve, that is, matter made up of porous crystals wherein the pores of the crystals are of molecular dimension and are of uniform size. A particularly suitable solid adsorbent for straight chain organic compounds, such as straight chain hydrocarbons, is a calcium alumino-silicate, apparently actually a sodium calcium alumino-silicate manufactured by Linde Air Products Company and designated Linde Type 5A Molecular Sieve. The crystals of this particular calcium alumino-silicate have a pore size or diameter of about 5 Angstrom units, a pore size sufficiently large to admit straight chain hydrocarbons, such as the normal paraffins, to the substantial exclusion of the non-straight chain naphthenic and aromatic and isoparaffinic and isoolefinic hydrocarbons. This particular selective adsorbent is available in various sizes such as $\frac{1}{16}''$ and $\frac{1}{8}''$ diameter pellets as well as in the form of a finely divided powder.

Other suitable solid selective adsorbents include the synthetic and natural zeolites, which, when dehydrated, may be described as crystalline zeolites having a rigid three dimensional anionic network and having interstitial dimensions sufficiently large to adsorb straight chain hydrocarbons but sufficiently small to exclude non-straight chain hydrocarbons. The naturally occurring zeolite, chabazite, exhibits such desirable properties. Another suitable naturally occurring zeolite is analcite $$NaAlSi_2O_6 \cdot H_2O$$

which, when dehydrated, when all or part of the sodium is replaced by an alkaline earth metal, such as calcium, by base exchange yields a material which may be represented by the formula $(Ca,Na_2)Al_2Si_4O_{12} \cdot 2H_2O$ and which, after suitable conditioning, will adsorb straight chain hydrocarbons to the substantial exclusion of non-straight chain hydrocarbons. Naturally occurring or synthetically prepared phacolite, gmelinite, harmotome and the like or suitable base exchange modifications of these are also suitable.

Other solid selective adsorbents may be employed in the practice of this invention. For example, it is contemplated that selective adsorbents having the property of selectively adsorbing straight chain hydrocarbons over non-straight chain hydrocarbons in the manner of a molecular sieve may be obtained by suitable treatment of various oxide gels, especially metal oxide gels of the polyvalent amphoteric metal oxides. Other solid adsorbents which selectively adsorb straight chain hydrocarbons to the substantial exclusion of non-straight chain hydrocarbons are also known.

Described more particularly, the separation process in accordance with this invention calls for carrying out the adsorptive separation of the straight chain hydrocarbons at a relatively elevated pressure $P_1$ followed by the desorption of the adsorbed straight chain hydrocarbons at a relatively reduced pressure $P_2$. Any relatively elevated adsorption pressure $P_1$ may be employed in the practice of this invention. Usually an adsorption pressure in the range 0–10,000 p. s. i. g. is suitable. The choice of adsorption pressure $P_1$ is sometimes dependent upon the composition of the mixture undergoing separation or whether or not it is desired to carry out liquid phase adsorption or vapor phase adsorption. Furthermore, any relatively reduced desorption pressure $P_2$ may be employed in the practice of this invention provided, of course, $P_2$ is less than $P_1$. The relationship or ratio of the adsorption pressure $P_1$ (absolute) to the desorption pressure $P_2$ (absolute) as indicated by $P_1/P_2$ is suitably in the range 1.1–750. Satisfactory operations have been carried out wherein the ratio was not greater than 200. Generally it is preferred to employ an adsorption pressure in the range 100–2,000 p. s. i. g. and a desorption pressure in the range 0–100 p. s. i. g.

The adsorption operation may be carried out at any suitable temperature depending to some extent upon the composition of the mixture undergoing separation for the recovery of straight chain organic compounds therefrom and depending upon whether or not it is desired to carry out vapor phase or liquid phase adsorption. An adsorption temperature in the range 50–1000° F. is usually satisfactory.

The desorption temperature may be any temperature in the range 50–1000° F., either higher or lower than the adsorption temperature. It is preferred, however, that the adsorption and desorption temperatures be substantially the same, i. e. that the adsorption-desorption operations be carried out substantially isothermally. It is realized that higher adsorption and desorption temperatures may be employed in the practice of this invention, the upper temperature limitation being governed by the temperature stability of the selective adsorbent material, the temperature stability of the mixture undergoing separation and the temperature stability of the adsorbed-desorbed straight chain organic compounds. When a calcium alumino-silicate, such as Linde Type 5A Molecular Sieve, is employed as the selective adsorbent the adsorption and/or desorption temperature should not exceed about 1300° F. since a temperature above about 1300° F. causes destruction of the adsorbent material, presumably by collapse of the crystal structure.

As indicated hereinabove, the adsorption operation may be carried out in either the liquid phase or the vapor phase. It is preferred, however, to carry out the desorption operation in the vapor phase, that is, during the desorption operation it is preferred to adjust the temperature and pressure thereof with respect to the straight chain organic compounds being desorbed such that the desorbed straight chain organic compounds are in the vapor phase.

In a liquid phase adsorption operation at an elevated temperature and pressure, the adsorption temperature is preferably substantially above the normal atmospheric boiling point of the straight chain organic compounds in the mixture undergoing separation and preferably also above the normal atmospheric boiling point of the mixture undergoing separation. Following the adsorption operation the remaining liquid phase, now having a substantially reduced amount of straight chain organic compounds, is separated from the adsorbent, while still maintaining the relatively elevated adsorption pressure. Subsequently the adsorbent material is subjected to a relatively reduced desorption pressure with the result that the absorbed straight chain organic compounds are flashed off or desorbed from the adsorbent under substantially isothermal conditions. It is realized that the heat or desorption will cause some temperature decrease or cooling of the adsorbent during the desorption operation with the result that strictly isothermal adsorption-desorption operations may not be possible without the addition of heat to the adsorbent material during the desorption operation. The cooling effect of the heat of desorption can, however, be counteracted or compensated for during the desorption operation by contacting or passing through the adsorbent material a hot gaseous stripping medium at a sufficient temperature to supply the heat of desorption and thereby maintain the desorption operation at substantially the same temperature as the adsorption operation. Any suitable inert gaseous stripping medium may be employed to supply the heat of desorption. Preferably the molecular dimensions of the stripping medium or agent permit it to enter the pores of the selective adsorbent and thereby aid in displacing the adsorbed straight chain organic compounds therefrom. Typical suitable inert gaseous stripping agents include nitrogen, flue gas, carbon dioxide, methane, hydrogen, the monatomic gases, natural gas, steam or superheated steam and the like.

During the vapor phase adsorption-desorption substantially the same operations described hereinabove with respect to liquid phase adsorption are employed. More particularly after the selective adsorbent has been substantially saturated with respect to straight chain organic compounds or after the straight chain organic compounds have been removed to the desired extent from the mixture undergoing separation, the treated mixture is displaced or separated from contact with the adsorbent material by means of a gaseous, inert, displacing medium. The pressure exerted upon the adsorbent material in the system is then reduced with the result that the adsorbed straight chain organic compounds are released or tend to be released from the adsorbent material.

The practice of this invention is particularly applicable to the separation of straight chain hydrocarbons from mixtures containing the same together with non-straight chain hydrocarbons. Straight chain hydrocarbon-containing mixtures which are suitably treated in accordance with this invention for the separation of the straight chain hydrocarbons therefrom include the various petroleum fractions such as naphtha fraction, a kerosene fraction, a diesel oil fraction, a gas oil fraction and the like. Particularly suitable for treatment in accordance with this invention are straight chain hyrocarbon-containing fractions having a boiling point or boiling range in the range of 40–600° F. and containing at least a substantial amount of straight chain hydrocarbons, e. g. 2–35% by volume and higher.

The following examples are illustrative of the practice of this invention.

EXAMPLE 1

A columnar, fixed bed of selective adsorbent comprising 1067 grams of $\frac{1}{16}''$ pellets of a calcium aluminosilicate (Linde Type 5A Molecular Sieve) was contacted at a temperature of 425° F. with a vaporized catalytic reformed gasoline, namely a Platformate, having an octane number of 80, at substantially atmospheric pressure and at a space velocity of about 1 v./hr./v. There was recovered as a vaporous effluent an upgraded gasoline product having a reduced amount of straight chain hydrocarbons, in fact an ungraded gasoline substantially free of straight chain hydrocarbons and exhibiting and octane number CFRR Micro-clear of 89.3. The recovered upgraded gasoline or effluent amounted to 84.8% by volume of the feed charge. The adsorbed straight chain hydrocarbons were desorbed from the adsorbent material at a temperature of 425° F. and at an absolute pressure of 40 mm. Hg. The desorption of the straight chain hydrocarbons from the adsorbent material was aided by the injection of a stream of nitrogen during the desorption operation so as to sweep out the desorbed straight chain hydrocarbons from the adsorbent material and from the vessel containing the adsorbent. There was recovered a fraction containing substantially only straight chain hydrocarbons in an amount equal to 15.2% by volume of the charge.

EXAMPLE 2

A number of runs were carried out at a relatively elevated temperature and pressure in order to effect vapor phase selective adsorption of straight chain hydrocarbons from an aviation gasoline base stock, followed by desorption at substantially atmospheric pressure. These runs were carried out as follows. The vessel containing a fixed bed of selective adsorbent (Linde Type 5A Molecular Sieve) was pressured to the desired adsorption pressure by means of a gas, such as nitrogen. After the vessel had been brought up to the desired adsorption temperature and pressure, the vaporized mixture or charge stock to be upgraded by separation of the straight chain hydrocarbons therefrom was introduced thereinto. After a period of time, usually when the selective adsorbent was substantially saturated with respect to straight chain hydrocarbons the injection of vaporized charge stock thereinto was discontinued and the introduction of a gaseous displacing medium was started in order to sweep out or displace any of the gaseous treated charge stock from the adsorption vessel. Introduction of a gaseous sweeping or displacing medium is advantageous when it is desired to obtain a desorbate containing substantially only straight chain hydrocarbons and/or a treated charge stock substantially free of straight chain hydrocarbons. After substantially all of the treated charge stock was displaced from the adsorption vessel, the pressure in the adsorption vessel was reduced to a suitable low value with the result that the adsorbed straight chain hydrocarbons were desorbed from the adsorbent material. The desorption of the straight chain hydrocarbons from the adsorbent material was aided by the continued injection of methane as the displacing or stripping medium during the desorption operation which was carried out at substantially atmospheric pressure and at a temperature of about 700° F. The desorption operation was carried out until substantially all of the straight chain hydrocarbons were desorbed. The result of these operations are set forth in the accompanying Tables I and II.

*Table I*

SELECTIVE FINISHING OF AVIATION BASE STOCK 92.2 CLEAR CFRR: ¾ HOUR ADSORPTION PERIOD THROUGHPUT—1 V./V./HR.

| Run No. | Average Adsorption Temperature, °F. | Adsorption Pressure, p. s. i. g. | Average RI for 1st 550 cc. Product | Average CFRR Clear Octane No. for 1st 550 cc. Est. |
|---|---|---|---|---|
| 1 | 501 | 200 | 1.4545 | 97.3 |
| 2 | 631 | 200 | 1.4550 | 97.5 |
| 3 | 526 | 350 | 1.4554 | 97.7 |
| 4 | 696 | 350 | 1.4544 | 97.3 |
| 5 | 508 | 500 | 1.4551 | 97.6 |
| 6 | 614 | 500 | 1.4560 | 97.9 |
| 7 | 721 | 500 | 1.4542 | 97.2 |
| 8 | 514 | 600 | 1.4555 | 97.8 |
| 9 | 613 | 600 | 1.4555 | 97.8 |
| 10 | 714 | 600 | 1.4554 | 97.7 |

*Table II*

SELECTIVE FINISHING OF A CATALYTIC REFORMED AVIATION BASE STOCK ½ HOUR ADSORPTION PERIOD THROUGHPUT 1 V./V./HR.

| Run No. | Average Adsorption Temp., °F. | Adsorption Pressure, p. s. i. g. | Average RI for 1st 365 cc. | Avg. CFRR Octane No. for 1st 365 cc. Est. |
|---|---|---|---|---|
| 11 | 501 | 200 | 1.4555 | 97.8 |
| 12 | 631 | 200 | 1.4571 | 98.6 |
| 13 | 526 | 350 | 1.4562 | 98.1 |
| 14 | 696 | 350 | 1.4565 | 98.2 |
| 15 | 508 | 500 | 1.4559 | 98.0 |
| 16 | 614 | 500 | 1.4576 | 98.8 |
| 17 | 721 | 500 | 1.4560 | 98.0 |
| 18 | 514 | 600 | 1.4574 | 98.7 |
| 19 | 613 | 600 | 1.4573 | 98.6 |
| 20 | 714 | 600 | 1.4561 | 98.1 |

To effect adsorption of the straight chain organic compounds any suitable or conventional means or method for effecting liquid-solid or gas-solid contact may be employed. The adsorbent material may be in the form of pellets, powder, beads, granules, etc. and employed in a fixed bed, moving bed, fluidized bed and concurrently or countercurrently contacted with the mixture undergoing separation. Any satisfactory throughput may be employed, e. g., in the range 0.2–20.0 volume liquid charge mixture per volume of adsorbent per hour. The periods of adsorption and desorption may be equal or different depending upon the results desired, composition of charge mixture, extent of adsorptive separation desired and various economic factors.

Although the practice of this invention has been described hereinabove with reference to the separation of straight chain hydrocarbons from non-straight chain hydrocarbons it is apparent, in view of the accompanying disclosure, that the invention is also applicable to the separation of other compounds such as the separation of straight chain alcohols from non-straight chain alcohols, more particularly the separation of iso-, secondary, and tertiary alcohols. By employing the practice of this invention n-propanol, n-butanol, n-pentanol, n-hexanol, n-heptanol, n-octanol, n-nonanol, n-decanol and their higher molecular weight homologs may be separated from their corresponding non-straight chain isomers or non-terminal hydroxy (OH) substituted isomers, such as the corresponding iso-, secondary, and tertiary alcohols.

As will be apparent to those skilled in the art upon reading the foregoing disclosure many modifications, substitutions and changes are possible in the practice of this invention without departing from the spirit or scope thereof.

We claim:

1. A process for separating straight chain hydrocarbons from a mixture containing the same together with non-straight chain hydrocarbons which comprises contacting said mixture in the vapor phase at an elevated temperature and pressure with a selective adsorbent which selectively absorbs straight chain hydrocarbons to the substantial exclusion of non-straight chain hydrocarbons to adsorb straight chain hydrocarbons therefrom to yield a gaseous treated effluent having a reduced amount of straight chain hydrocarbons, displacing said gaseous effluent from said solid adsorbent material by means of a displacing medium and subjecting the resulting adsorbent material now substantially free of said effluent to a reduced pressure while contacting said adsorbent material with a gaseous stripping medium at a suitable elevated temperature to desorb the adsorbed straight chain hydrocarbons therefrom and to maintain the desorption operation at substantially the same temperature as the adsorption operation, the resulting desorbed straight chain hydrocarbons being in the gaseous phase.

2. A method in accordance with claim 1 wherein the desorption operation is carried out at a pressure less than atmospheric.

3. A method in accordance with claim 1 wherein said adsorbent is an alumino-silicate.

4. A method in accordance with claim 1 wherein said displacing medium is a normally gaseous hydrocarbon.

5. A method in accordance with claim 1 wherein said displacing medium and said gaseous stripping medium are the same material.

References Cited in the file of this patent
UNITED STATES PATENTS

| | | |
|---|---|---|
| 1,453,215 | Voress et al. | Apr. 24, 1923 |
| 2,306,610 | Barrer | Dec. 29, 1942 |
| 2,376,425 | Frey | May 22, 1945 |
| 2,390,536 | Houdry et al. | Dec. 11, 1945 |
| 2,425,535 | Hibshman | Aug. 12, 1947 |
| 2,442,191 | Black | May 25, 1948 |
| 2,449,402 | Lipkin | Sept. 14, 1948 |
| 2,586,889 | Vesterdal et al. | Feb. 26, 1952 |
| 2,620,363 | Hibshman | Dec. 2, 1952 |